Patented May 18, 1943

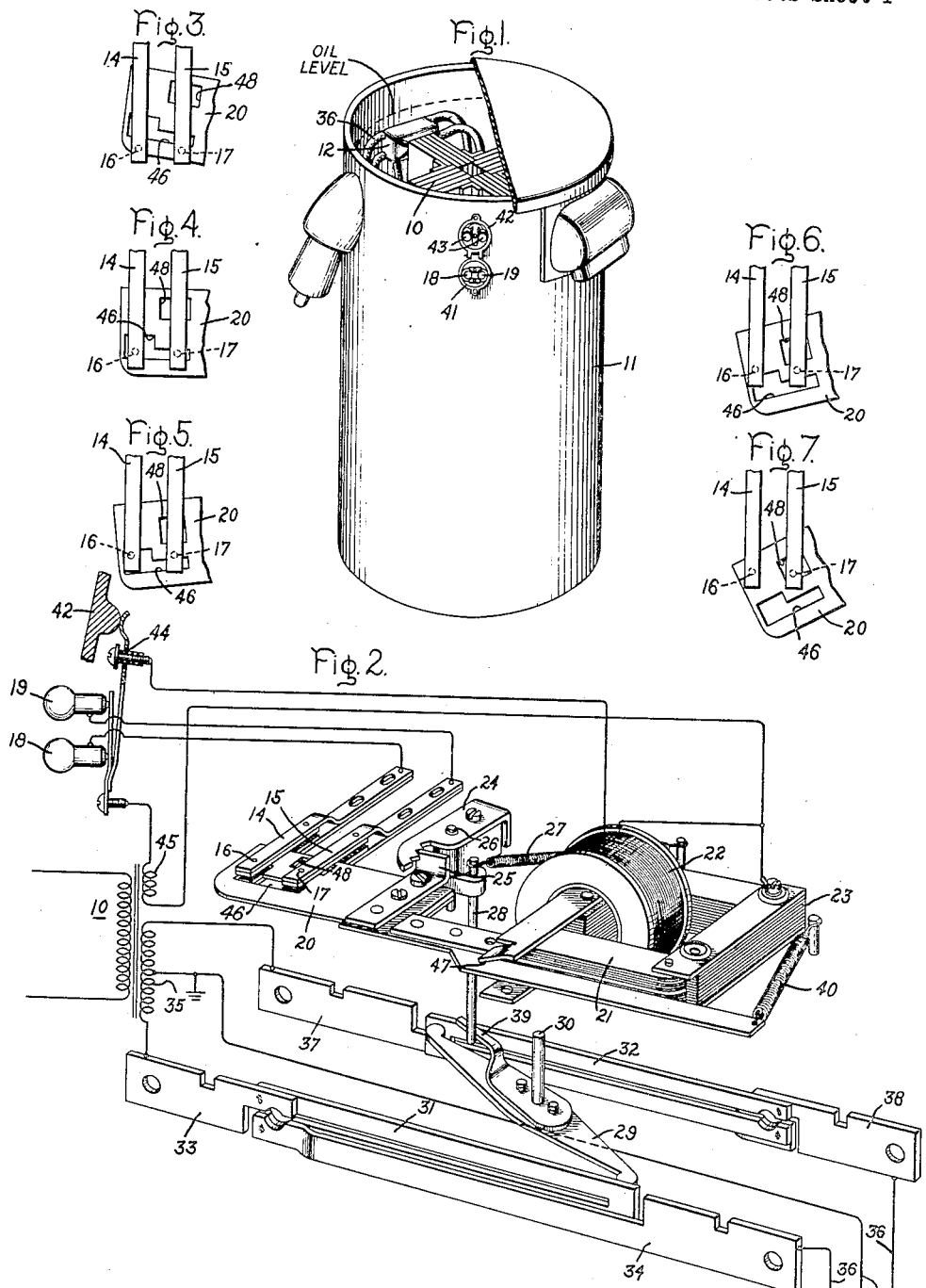

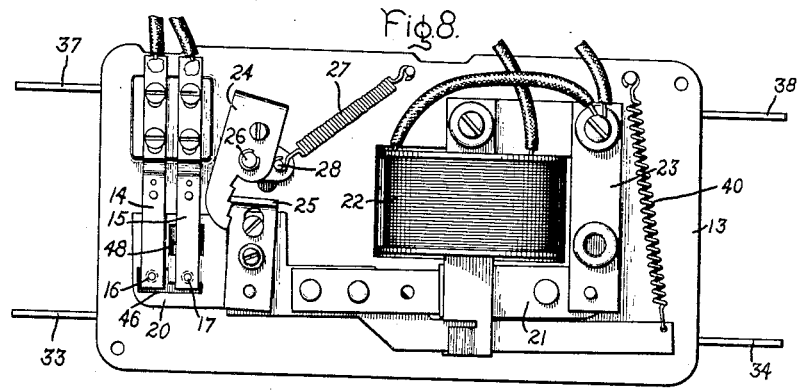
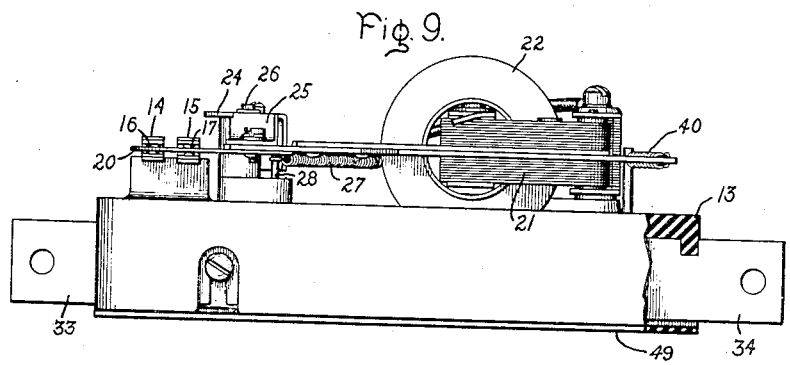
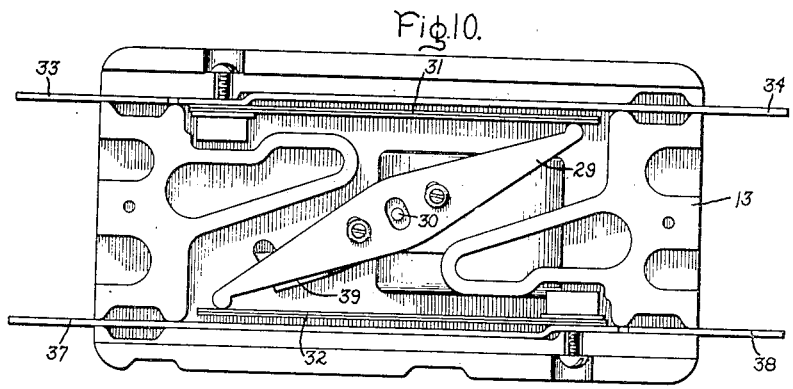

2,319,646

UNITED STATES PATENT OFFICE 2,319,646

TRANSFORMER LOAD INDICATOR

Edward D. Treanor, Pittsfield, Mass., assignor to General Electric Company, a corporation of New York Application September 28, 1939, Serial No. 296,959

9 Claims. (Cl. 177—311)

My invention relates to transformer load indicators. The permissible or maximum safe load which a transformer can carry is determined by the internal temperature of the windings and their insulation, and it is usually considered that the average temperature of a transformer winding should not be permitted to exceed about 95° C. Higher temperatures than this are sometimes permitted for short times, however, because the serviceable life of a transformer is affected not only by a high temperature but also by the length of time during which the transformer is subjected to that temperature. High temperature for a short period of time may be no more injurious than a considerably lower temperature for a longer period of time. The internal temperature of a transformer and, therefore, the maximum safe load which the transformer can carry depends not only upon the transformer load but also upon the rate at which heat is dissipated from the transformer. Distribution and power transformers are usually immersed in an insulating liquid, and the rate of heat dissipation from the transformer depends upon the temperature of the liquid which in turn is affected by the temperature of the air surrounding the casing containing the transformer and liquid. The permissible or maximum safe load for a transformer is thus a function of the load and the temperature of the liquid in which the transformer is immersed. The general object of the invention is to provide an improved transformer load indicating device responsive to the temperature of the liquid in which the transformer is immersed and to the heating effect of the current or load in one of the transformer windings, and which will indicate the ratio of the load carried by the transformer at any time to the maximum safe load which the transformer could carry under the same temperature conditions of the liquid.

The invention will be better understood from the following description taken in connection with the accompanying drawings in which Fig. 1 is a perspective view of a transformer provided with a load indicator constructed in accordance with the invention; Fig. 2 is an explanatory view of the load indicator; Figs. 3 to 7 inclusive are views indicating different positions of signal-controlling contacts forming a part of the indicator; Fig. 8 is a plan view of the indicator; Fig. 9 is a side view of the indicator; and Fig. 10 is a bottom view of the indicator with the cover removed.

Like reference characters indicate similar parts in all of the figures of the drawings.

The transformer 10 shown in Fig. 1 is immersed in insulating oil or other liquid in a casing 11 and is provided with a load indicator 12 constructed in accordance with the invention. The load indicator 12 includes a base portion 13, which may be formed of suitable molded material and which carries two fixed contact arms 14 and 15 with contacts 16 and 17 constituting controlling means for two signal lamps 18 and 19. The controlling means also includes a movable contact plate 20 secured to the pivoted armature 21 of an electromagnet having a winding 22 and a core 23. The position of the movable contact 20 is determined or selectively controlled by a latch 24 formed with notches or steps which engage a projection 25 secured to the movable contact 20. The latch 24 is pivotally supported on a post 26 and is biased into engagement with the projection 25 by a spring 27. A short rod 28 secured to the latch 24 extends through the base 13. A lever 29 under the base 13 is pivoted at its center about a shaft 30, the opposite ends of the lever 29 extending to engage two spaced U-shaped thermostatic strips 31 and 32. The thermostatic strip 31 is connected between the two adjacent ends of two conductive strips 33 and 34, the strip 33 forming a terminal which is connected to one terminal of the secondary winding 35 of the transformer 10 and the other strip 34 forming a terminal for connection to one side of an external secondary circuit 36. The thermostatic strip 31 is thus connected in series with one side of the secondary circuit of the transformer. The thermostatic strip 32 is similarly connected between two conductive strips 37 and 38 and in series with the other side of the secondary circuit 36 of the transformer. The center of the secondary winding 35 is grounded and connected to the neutral conductor 36′, this conductor 36′ and the two conductors 36 forming a three-conductor secondary circuit with a grounded neutral such as is commonly used in the distribution of electric light and power.

The arm 39 secured to the lever 29 engages the rod 28. As the thermostatic strips 31 and 32 are heated by the combined heating effects of the surrounding liquid and the transformer secondary currents flowing in the strips, the strips 31 and 32 bend toward each other and rotate the lever 29 and the arm 39 about the shaft 30. This movement of the arm 39 acts through the rod 28 to rotate the latch 24 and release the projection 25 to drop by steps with a snap action into the succeeding notches of the latch 24, the projection 25 with the movable contact 20 and the armature 21 being biased away from the latch 24 by an actuator spring 40. The load on the transformer 10 is commonly unbalanced between the two sides of the three-conductor secondary circuit so that the current in one of the conductors 36 may be greater than in the other conductor 36 and the two halves of the secondary winding 35 may be unequally loaded. The temperature of that half of the winding 35 which is carrying the greatest current will of course be higher than that in the other half of the winding. However, when the current in either half of the winding 35 reaches a predetermined maximum safe value, the corresponding thermostatic strip 31 or 32 will respond and operate the lever 29. The lever 29 thus responds to current conditions in either half of the winding 35 and substantially independently of the current condition in the other less loaded winding half.

The two signal lamps 18 and 19 are enclosed in a housing 41 mounted on the side of the transformer casing 11 as shown in Fig. 1, the housing 41 including a cover 42 provided with a transparent cover glass or lens 43 for each lamp. These cover glasses 43 preferably have distinctive colors, such as green and red. When the cover 42 of the lamp housing 41 is closed, it engages a switch 44 and holds this switch open as shown in Fig. 2. If the cover 42 is opened, the switch 44 will close and connect the winding 22 across a source of current, which may be a suitable auxiliary winding 45 on the transformer 10. This will energize the winding 22 which will act as a restoring coil to attract the armature 21 and restress the actuator spring 40 and move the contact 20 to its extreme inner position, in which the movable contact 20 will meet both of the fixed contacts 16 and 17 as shown in Fig. 3 and both lamps 18 and 19 will be lighted. Thus by opening the cover 42 of the lamp housing 41, the signal lamps 18 and 19 may be tested to determine whether or not they are burned out. Upon closing the cover 42 of the lamp housing 41, the switch 44 will open the circuit through the winding 22 and the movable contact 20 will drop back under the force of the actuator spring 40 until the projection 25 engages the first or inner notch of the latch 24, assuming, of course, that the latch 24 has not been rotated away from the projection 25 by a heavy load current in one or both of the thermostatic strips 31 and 32. In this position of the movable contact 20 with the projection 25 engaging the first notch of the latch 24, the movable contact 20 is in the position indicated in Fig. 4, where an opening 46 in the movable contact 20 prevents engagement with the fixed contacts 16 and 17 and both of the lamps 18 and 19 are dark. This will indicate a light load on the transformer 10. As the load on the transformer approaches its safe maximum value, one or both of the thermostatic strips 31 and 32 will bend inwardly and cause the latch 24 to rotate until the projection 25 is released and drops with a snap action under the force of the actuator spring 40 into the next notch of the latch. This is the position of the latch shown in Fig. 2 and the corresponding position of the movable contact 20 as indicated in Fig. 2 and Fig. 5. In this position of the movable contact 20, its opening 46 still prevents its engagement with the fixed contact 16, so that the signal lamp 18 will still be dark. The movable contact 20 however, meets the fixed contact 17 and closes the circuit through the lamp 19 to light this lamp. This lamp 19 may be the green lamp or signal and the lighting of this lamp alone will indicate that the load on the transformer 10 is approaching its safe maximum value. The lamp 19 may be lighted for example, when the load on the transformer 10 reaches 75 per cent of its safe maximum value. As the load on the transformer 10 increases further, one or both of the thermostatic strips 31 and 32 will continue to bend inwardly and cause the latch to continue to rotate until the projection 25 is again released and drops with a snap action under the force of the actuator spring 40 into the next notch of the latch and the movable contact 20 drops back into the position illustrated in Fig. 6. In this position of the movable contact 20, it meets both of the lamp contacts 16 and 17, and both of the lamps 18 and 19 are lighted. The lighting of both lamps may indicate that the load on the transformer 10 has reached its maximum safe value. Upon a further increase in the load on the transformer 10, the latch 24 will release the projection 25 to drop out of the last notch of the latch and reach its extreme outer position with the armature 21 in engagement with a stop 47 and the fixed contact 20 in the position indicated in Fig. 7. In this position of the fixed contact 20, an opening 46 prevents its meeting the lamp contact 17, and the green lamp 19 is dark. The fixed contact 20 still meets the lamp contact 16, however, and the red lamp or signal 18 alone is now lighted to indicate that the load on the transformer is beyond the safe maximum limit. This appearance of the red signal alone may indicate, for example, that the transformer load has reached 125 per cent of its safe maximum value. The contact arrangement has the advantage that the number of contacts necessary is considerably smaller than the required number of load indications. The lever 29 and the thermostatic strips 31 and 32 are enclosed in a recess in the base portion 13 and this recess is provided with a cover 49. The quantity of insulating liquid surrounding the thermostatic strips 31 and 32 is thus restricted so that the heat produced by the currents in the thermostatic strips cannot be dissipated too rapidly.

The invention has been explained by describing and illustrating a particular embodiment thereof, but it will be apparent that changes may be made without departing from the spirit of the invention and the scope of the appended claims.

What I claim as new and desire to secure by Letters Patent of the United States is:

1. A transformer load indicating device comprising a signal means, control means for said signal means, an actuator for said control means, stepped releasing means for said actuator, means responsive to the transformer load condition for actuating said stepped releasing means, a housing for said signal means including a cover, means responsive to the opening of said cover for resetting said actuator and operative to move said signal control means to an operative position for causing an indication of the operative condition of said signal means.

2. A transformer load indicating device including a signal means, control means for said signal means including a movable contact, an actuator spring for said movable contact, releasable means for restraining said movable contact in a plurality of stepped positions, means responsive to transformer load conditions for actuating said releasable means, electromagnetic means operatively connected to said movable contact, an enclosing housing for said signal means including a cover, control means for said electromagnetic means responsive to the opening of said cover for restoring said spring and shifting said movable contact to a predetermined position for indicating the operative condition of said signal means.

3. A load-indicating device for a transformer having a fluid dielectric, including a signal, means for controlling said signal, a magnetic core including a movable armature, means for operatively connecting said signal control means for movement with said movable armature, means for controlling said signal control means including a thermostat arranged for connection in a transformer circuit and responsive to the temperature of said dielectric so that said thermostat will be actuated in response to a temperature value proportional to the temperature of said liquid and the heating effect of the current in said transformer circuit, a coil on said core for attracting said armature to restore said signal control means to a position corresponding to a light load on the transformer, a switch in circuit with the coil, and a cover for the signal, said cover engaging the switch when the cover is closed to hold the switch open.

4. A load indicating device for a transformer having a secondary circuit comprising two line conductors and a grounded neutral conductor, signal means for indicating a plurality of successive load conditions of said transformer, control means for said signal means, thermostats adapted for connection in each of said line conductors, means operatively connecting said thermostats to said control means for joint or alternative control thereof through any of a plurality of steps, said connecting means including a pivoted lever adapted to be engaged by either or both of said thermostats whereby said control means will be adjusted in accordance with the load condition of the heaviest loaded one of said two line conductors substantially independently of the load condition of the other of said line conductors.

5. A load-indicating device for a transformer having a fluid dielectric including a signal, means for controlling said signal, two spaced thermostats arranged for connection in two conductors of a transformer circuit and arranged to be responsive to the temperature of said dielectric fluid so that said thermostat will be actuated in response to temperature values proportional to the temperature of said liquid and the heating effect of the current in said transformer circuit, and means for operatively connecting said thermostats to said signal control means so that said signals will be operated in response to the greater of said temperature values.

6. A load indicating device for a transformer having a plurality of secondary conductors capable of carrying different load currents, a signal for indicating a plurality of successive load conditions of said transformer, control means for said signal, actuating means including a step mechanism for said control means, thermostats arranged in each of said plurality of secondary conductors, means operatively connecting said thermostats to said step mechanism for control of said actuating means, said operative connection including means movable by the thermostat of the heaviest loaded one of said plurality of conductors and substantially independently of the thermostats in the less loaded conductors.

7. A load-indicating device for a transformer having a fluid dielectric including a signal, means for controlling said signal, means for controlling said signal control means including a thermostat arranged for connection in a transformer circuit and responsive to the temperature of said dielectric fluid so that said thermostat will be actuated in response to a temperature value proportional to the temperature of said liquid and the heating effect of the current in said transformer circuit, magnetic means including a coil for restoring said signal control means to a position corresponding to a light load on said transformer, a switch in circuit with said coil, and a cover for said signal, said cover engaging said switch when said cover is closed to hold said switch open.

8. A load indicating device for an electrical apparatus including electrical signal means, control means for said signal means including a movable contact, and means for moving said movable contact beyond its normal position for connecting said signal means in circuit for testing the operative condition of said signal means.

9. A load indicating device for an electrical apparatus including electrical signal means, control means for said signal means including a movable contact, actuator means for said movable contact, and means for moving said movable contact to a predetermined position for resetting said actuator means and for connecting said signal means in circuit for testing the operative condition of said signal means.

EDWARD D. TREANOR.